United States Patent
McIntyre et al.

(10) Patent No.: US 6,324,783 B1
(45) Date of Patent: Dec. 4, 2001

(54) INTEGRALLY MOULDED PLASTIC LANDSCAPE EDGING STRIP AND SPIKES

(75) Inventors: Michael McIntyre; Ray Rodenburgh, both of Georgetown; Sid Gibson, Stratford, all of (CA)

(73) Assignee: Hengestone Holdings Inc. (CA)

( * ) Notice: Subject to any disclaimer, the term of this patent is extended or adjusted under 35 U.S.C. 154(b) by 0 days.

(21) Appl. No.: 09/454,420

(22) Filed: Dec. 3, 1999

(30) Foreign Application Priority Data

Nov. 25, 1999 (CA) .................................................. 2290836

(51) Int. Cl.[7] ...................................................... A01G 1/08
(52) U.S. Cl. .................................................................. 47/33
(58) Field of Search ................................. 47/33; 52/102; 404/6, 7

(56) References Cited

U.S. PATENT DOCUMENTS

| | | | |
|---|---|---|---|
| D. 329,709 | 9/1992 | Strobl, Jr. | D25/164 |
| 4,277,434 | * 7/1981 | Conway | 264/297 |
| 5,092,076 | 3/1992 | Terreta | 47/33 |
| 5,212,917 | * 5/1993 | Kurtz et al. | 47/33 X |
| 5,240,343 | 8/1993 | Strobl, Jr. | 404/7 |
| 5,375,369 | 12/1994 | VerHoeve | 47/33 |
| 5,375,941 | 12/1994 | Strobl, Jr. | 404/7 |
| 5,377,447 | * 1/1995 | Fritch | 47/33 |
| 5,379,546 | 1/1995 | Popp | 47/33 |
| 5,640,801 | * 6/1997 | Rynberk | 47/33 |
| 5,857,288 | 1/1999 | Wiste | 47/33 |
| 5,930,947 | * 8/1999 | Eckhoff | 47/33 X |
| 6,071,038 | * 6/2000 | Strobl Jr. | 47/33 X |
| 6,085,458 | * 7/2000 | Gau | 47/33 |

FOREIGN PATENT DOCUMENTS

22288964-A * 11/1995 (GB) .

* cited by examiner

Primary Examiner—Peter M. Poon
Assistant Examiner—Jeffrey L. Gellner
(74) Attorney, Agent, or Firm—Mark Kusner

(57) ABSTRACT

The invention relates to a. molded plastic landscape edging strip with integrally moulded plastic spikes that can be severed on site for use in installation and also serve during storage and handling to stiffen the rear edge of the flexible plastic edging strip. Plastic spikes are less expensive to manufacture than conventionally used galvanized steel spikes, however, when integrally moulded with the plastic edging, the marginal increase in cost of the spikes is very low. The costs and time involved in manufacturing, inventory maintenance, handling, shipping and installation are reduced as a result of integrally moulding the spikes and edging together. The edging strip has an elongate vertical wall with bottom edge, front and rear faces, a horizontal footing extending rearwardly from the bottom edge with longitudinally spaced apart apertures and elongate plastic spikes severably joined to the rearward end of the footing. The spikes have a cross-sectional profile adapted for vertical insertion through the apertures, and may include serrated edges to inhibit withdrawal after installation. The integral moulding of spikes with the edging relieves the installer and distributor from the burden of stocking and purchasing separate spikes, calculating the number of spikes necessary for installation, and eliminates the risk of misplacing spikes or forgetting to bring spikes to the job site. The integral moulding of spikes also ensures that edging and spike materials are compatible and will not corrode.

15 Claims, 3 Drawing Sheets

INTEGRALLY MOULDED PLASTIC LANDSCAPE EDGING STRIP AND SPIKES

TECHNICAL FIELD

The invention relates to a moulded plastic landscape edging strip with integrally moulded plastic spikes that can be severed on site for convenient access during installation and also serve during storage and handling to stiffen the rear edge of the flexible plastic edging strip.

BACKGROUND OF THE ART

The invention relates to a landscape edging strip of the type used for supporting the edges of paving stones, patio slabs, modular retaining wall units, or any unit paver, as well as a separator between landscape features such as gardens, hedges and turf, for example.

Edging strips are commonly used to separate landscaping features and as structural support for retaining the edges of paving stones, patio stones, gravel beds or other paved areas. In general, the edging strips are of an angle iron shape with a vertical wall to abut and support the edge of paving blocks or other features and a horizontal footing that rests on the ground surface. The footings generally include openings for holding long spikes driven into the ground surface to retain the edging material in place. Typically, the edging is buried under a two or three inch thick layer of soil and/or turf. Also, the footing portion can include large openings to permit grass roots to penetrate through the top surface of the footing and hide the edging under the covering soil/grass layer.

Examples of conventional landscapes edging strips are shown in U.S. Pat. No. 5,375,941 to Strobl Jr., U.S. Pat. No. 5,092,076 to Terreta, U.S. Pat. No. 5,379,546 to Popp and U.S. Pat. No. 5,857,288 to Wiste.

In all cases, conventional edging strips are purchased separately from the spikes used in installation. The distributor or retail vendor must stock separate components and the installer must calculate the correct number of spikes required for a given length of edging purchased.

As may be expected, errors occur frequently during installation where spikes may be forgotten, an inadequate number of spikes may be purchased or an excessive amount of spikes may be purchased. Delays in installation and unnecessary expenditure of funds and time may be associated with ensuring that correct amount of materials are delivered to the site.

From the distributor's point of view, two items of inventory must be purchased, accounted for and stocked in adequate volumes to meet demand. When a customer decides to purchase edging strips, the distributor must also assist the customer in calculating the necessary number of spikes to accompany the order. Different types of edging may require different numbers of spikes and as a result the purchaser may have too many or too few spikes to complete the project.

Typically installation of edging strips include compaction of a gravel sub-base, placement of the edging strip and driving galvanized steel spikes through the openings in the landscape edging. Galvanized spikes typically have a spiral outer surface.

Further disadvantages of conventional use of galvanized steel spikes are a relatively high cost and weight, and eventually the spikes may corrode under constant exposure to wet soil.

It is an object of the present invention to provide a moulded plastic landscape edging strip with integrally moulded plastic spikes to eliminate the necessity of stocking and purchasing separate components and to ensure that the necessary amount of spikes are conveniently delivered together with the edging strip when shipped to a construction site.

It is a further object of the invention to provide a moulded plastic landscape edging strip with integrally moulded plastic spikes of identical material to the edging strip thereby reducing manufacturing costs, eliminating the risk of spike corrosion and ensuring compatibility between the materials used in the edging strips and spikes.

Further objects of the invention will be apparent from review of the disclosure and description of the invention below.

DISCLOSURE OF THE INVENTION

The invention relates to a. moulded plastic landscape edging strip with integrally moulded plastic spikes that can be severed conveniently on site for use in installation and that also serve during storage and handling to stiffen the rear edge of the flexible plastic edging strip.

The edging strip has an elongate vertical wall with bottom edge, front and rear faces, a horizontal footing extending rearwardly from the bottom edge with longitudinally spaced apart apertures and elongate plastic spikes severably joined to the rearward end of the footing. The spikes have a cross-sectional profile adapted for vertical insertion through the apertures, and may include serrated edges to inhibit withdrawal after installation.

The integral moulding of spikes with the edging relieves the installer and the distributor from (1) stocking and purchasing separate spikes, (2) calculating the number of spikes necessary for installation, (3) eliminates the risk of misplacing spikes or forgetting to bring enough spikes to the job site, and (4) ensures that edging and spike materials are compatible and will not corrode. Plastic spikes are less expensive to manufacture than galvanized steel spikes in general, however, when integrally moulded with the plastic edging, the marginal increase in cost is very low. The costs and time involved in manufacturing, inventory maintenance, handling, shipping and installation are reduced as a result of integrally moulding the spikes and edging together.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
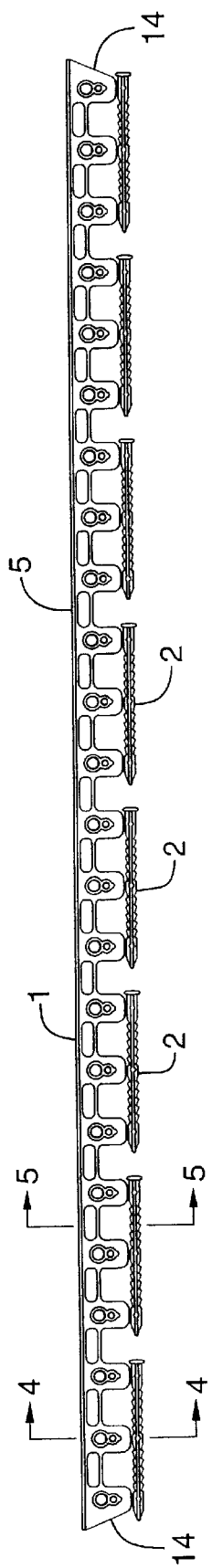
FIG. 1 is a top plan view of a complete edging strip manufactured in an 8 foot standard length with 8 integrally moulded plastic spikes attached with severable tabs to a rear edge of the plastic strip.
Figure 2:
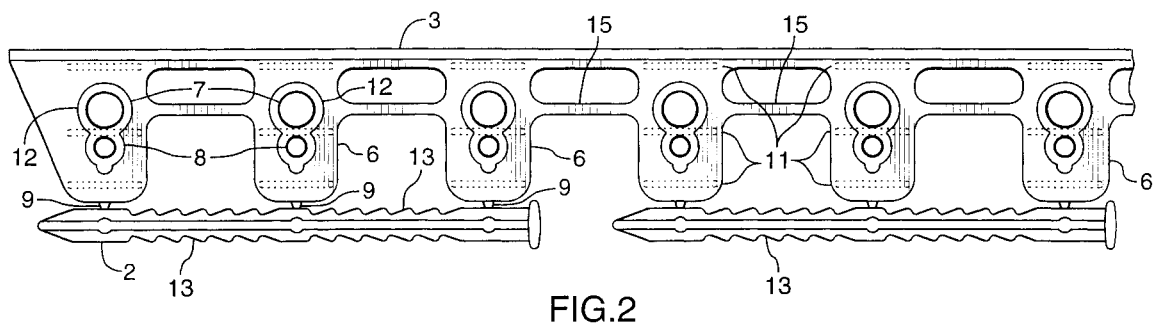
FIG. 2 is a detailed plan view of the left end of the edging strip with integrally moulded spikes.
Figure 3:
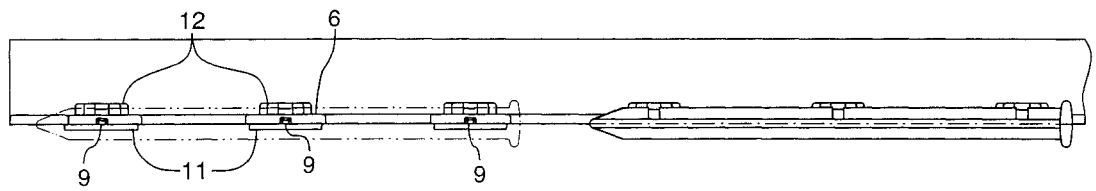
FIG. 3 is a rear elevation view of the edging strip portion from FIG. 2.
Figure 4:
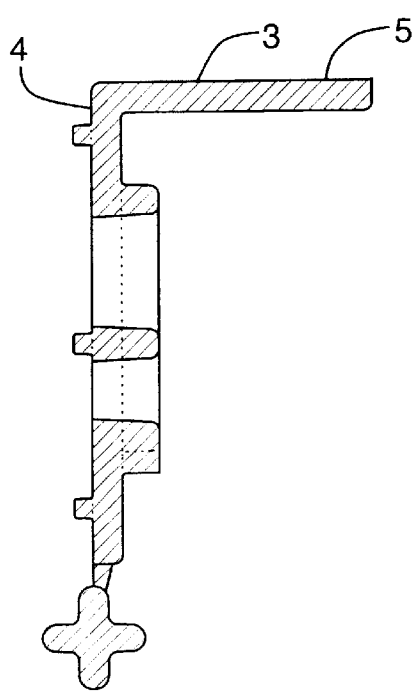
FIG. 4 is a sectional view through a footing path along lines 4—4 of FIG. 1.
Figure 5:
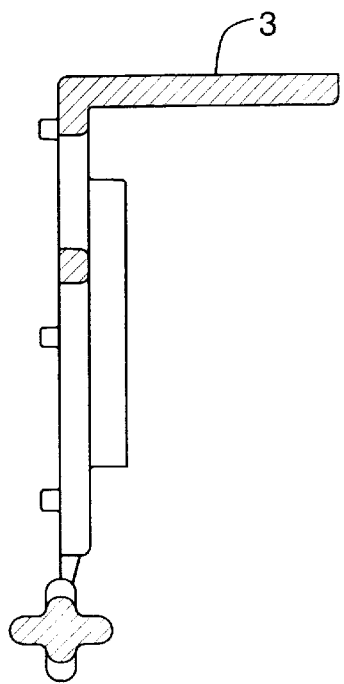
FIG. 5 is a sectional view through the vertical wall, footing, spike and stiffener belts between footing pads along lines 5—5 of FIG. 1.

FIG. 1 illustrates a moulded plastic landscape edging strip 1 with integrally moulded plastic spikes 2. As best shown in FIGS. 4 and 5, the edging strip includes an elongate vertical wall 3 with a bottom edge 4 and a front edge 5 for abutting pavement stones for example.

In the embodiment illustrated, the horizontal footing comprises a number of longitudinally spaced apart footing pads 6 all extending rearwardly from the bottom edge 4 of the vertical wall 3. Each pad 6 includes a large aperture 7 of size adapted for vertical insertion of the spikes 2 and a small aperture 8 sized for insertion of a galvanized steel spike, if that is the preference of the installer.

The plastic spikes 2 are joined to the rearward end of the footing pads 6 with severable plastic tabs 9. In the embodiment illustrated, each spike is joined with three tabs to three adjacent footing pads 6. It will be apparent that the tabs 9 may be easily clipped on site with a shovel, pruning clipper, knife blade or tin snips for example.

Since the plastic edging 1 is of relatively flexible material, the connection of spikes 2 with tabs 9 during shipping and handling serves to reinforce the rearward edge of the plastic edging. In addition, the integral moulding of the spikes 2 serves to balance the amount of material through the moulded cross-section which serves to prevent uneven warping or curving of the edging 1 during the moulding process and subsequent cooling. Injection moulds release the moulded component in a warm and relatively more flexible state. A degree of shrinkage is normally accounted for in the design of moulds. However, where the cross-section of a moulded component has areas which are much thicker than others, the amount of shrinkage varies across the section tending to warp or distort the moulded component during cooling. During cooling, the edging without integral spikes 2 would twist, arch or warp due to uneven stresses and shrinkage as a result of the relatively large amount of material used in the vertical wall. The integral moulding of the spikes 2 therefore serves to reinforce the rearward edge during the moulding process to prevent distortion and reinforces the edging during handling and storage. The cross-section is better balanced since the area of the vertical wall is balanced by the area of the spikes thereby improving resistance to bending, twisting and better distributing thermal stresses.

Figure 6:
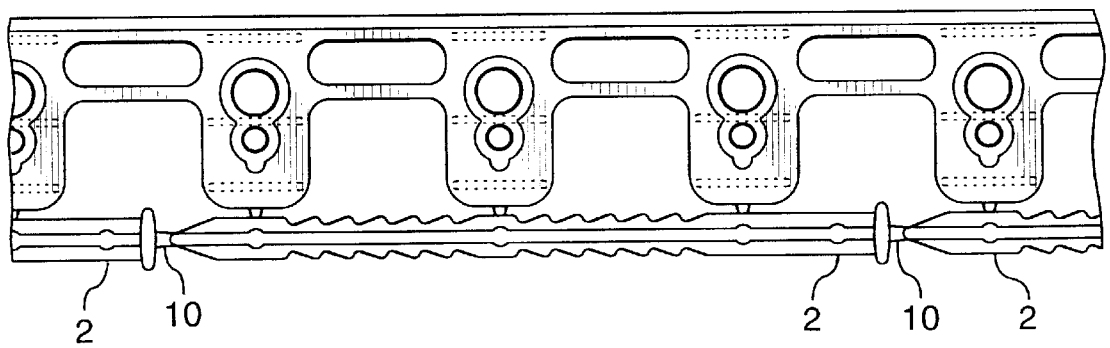
FIG. 6 is an alternative embodiment similar to FIG. 2, with the length of spikes extended and with spikes are joined together longitudinally with a severable tab to further reinforce the rearward edge of the landscape edging strip during handling and shipping.

FIG. 6 illustrates a second embodiment wherein further reinforcing of the rear footing edge may be obtained by extending the length of the spikes 2 and joining the adjacent ends or longitudinally adjacent spikes 2 together with severable tabs 10.

The building material distributor, retailer and installer are relieved of the necessity to calculate the number of spikes necessary. Plastic spikes can be manufactured at a cost that is much less than the cost of galvanized steel spikes. As well, the overall cost of purchasing the edging and plastic spikes is less due to handling efficiencies and the lower cost of manufacturing the spikes and edging together. The purchaser need not be concerned about purchasing and delivering to the site an adequate number of spikes since the edging automatically provides adequate spikes. The spikes cannot be misplaced or forgotten unintentionally.

In installation, the purchaser places the strip on a compacted bed of gravel. Each footing pad 6 includes longitudinal ridges 11 extending from the bottom surface of the pad 6 to improve the grip of the pad 6 on the prepared substrate. In addition, when the strips are stacked together during storage and handling the ridges 11 serve to prevent stacked strips from sliding longitudinally or transversely by engaging the adjacent strip.

To better grip the spikes 2 and to prevent cracking or damaging the footing pads 6, around each aperture 7 and 8 is a reinforcing peripheral boss 12 extending upwardly from the top surface of the pads 6. In the embodiment shown pairs of adjacent apertures 7 and 8 of two different sizes are disposed in transverse alignment and the pairs are longitudinally spaced apart with a reinforcing peripheral boss 12 encircling each pair of adjacent apertures 7, 8.

For ease of moulding, and structural strength, the spikes 2 in the embodiment illustrated have a cruciform transverse cross-sectional profile. The cruciform spike 2 is rigid, can be driven into relatively hard packed surfaces and can be easily moulded with a mould seam line parallel to one pair of edges. To prevent or inhibit withdrawal of the spikes 2, the spikes illustrated may include two longitudinally serrated edges 13.

As shown in FIG. 1, the longitudinal ends 14 of the strip 1 are mitred to enable adjacent strips to be disposed at an angle to each other. Of course, if desired the ends 14 can be cut easily with traditional tools to any desired angle.

Since edging strips are commonly placed in curved or serpentine configurations, as well as in straight line segments, the pads 6 are moulded in a straight line pattern with longitudinally spaced apart pads 6 severably joined together with longitudinal stiffeners 15. In the embodiment illustrated the stiffeners 15 are elongate belts extending between the pads 6 to assist in maintaining the edging 1 in a straight orientation. However, if the edging 1 is to be positioned in a curved or serpentine configuration, the stiffener belt 15 can be cut thereby rendering the edging flexible (once the tabs 9 have been clipped to remove the spikes 2).

Therefore, the invention provides several advantages over the existing prior art. The integral moulding of spikes 2 together with the edging alleviates many problems in purchasing separate spikes and edging stocking different components and ensuring that those components are properly delivered to a construction site. As well, the spikes 2 reinforce the rear edge during shipping, handling and during the cooling stage of moulding the plastic to prevent distortion. By providing severable stiffeners 15, the edging can be adapted for straight line disposition or to follow curved or serpentine orientations if desired.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A moulded plastic landscape edging strip with integrally moulded plastic spikes, comprising:
   an elongate vertical wall with bottom edge, front and rear faces;
   a horizontal footing extending rearwardly from the bottom edge with a plurality of longitudinally spaced apart apertures, wherein the footing comprises a plurality of longitudinally spaced apart pads; and a plurality of elongate plastic spikes severably joined to a rearward end of the footing, the spikes having a cross-sectional profile adapted for vertical insertion through the apertures.

2. An edging strip according to claim 1 wherein each spike has a longitudinal axis parallel to the wall, and wherein the spikes are severably joined to the footing with at least two longitudinally spaced apart tabs.

3. An edging strip according to claim 1 wherein the each pad is severably joined to a spike with a tab.

4. An edging strip according to claim 3 wherein each spike is joined to three footing pads.

5. An edging strip according to claim 4 wherein longitudinally adjacent spikes are severably joined together at adjacent ends.

6. An edging strip according to claim 1 wherein each pad includes projections extending from a bottom surface thereof.

7. An edging strip according to claim 6 wherein the projections comprise longitudinal ridges.

8. An edging strip according to claim 1 wherein the footing includes a reinforcing peripheral boss about each aperture.

9. An edging strip according to claim 8 wherein pairs of adjacent apertures of two different sizes are disposed in transverse alignment, the pairs being longitudinally spaced apart.

10. An edging strip according to claim 9 wherein a reinforcing peripheral boss encircles each pair of adjacent apertures.

11. An edging strip according to claim 1 wherein the spikes each have a cruciform transverse cross-sectional profile.

12. An edging strip according to claim 11 wherein the spikes each include two longitudinally serrated edges.

13. An edging strip according to claim 1 with mitred longitudinal ends.

14. An edging strip according to claim 1 wherein adjacent longitudinally spaced apart pads are severably joined together with longitudinal stiffeners.

15. An edging strip according to claim 14 wherein the stiffeners comprise elongate belts extending between pads.

* * * * *